MAGNETIC RECORDING SYSTEM

Filed May 15, 1953 2 Sheets-Sheet 1

INVENTORS
HARRY KENOSIAN
ERIC SEIF
DAVID A. STARR JR.
BY
Laurence R. Brown
ATTORNEY March 3, 1959 H. KENOSIAN ET AL 2,876,058

MAGNETIC RECORDING SYSTEM

Filed May 15, 1953 2 Sheets-Sheet 2

INVENTORS
HARRY KENOSIAN
ERIC SEIF
DAVID A. STARR JR.
BY
Lawrence R. Brown
ATTORNEY

United States Patent Office 2,876,058
Patented Mar. 3, 1959

2,876,058

MAGNETIC RECORDING SYSTEM

Harry Kenosian, Upper Darby, and Eric Seif, Philadelphia, Pa., and David A. Starr, Jr., Wenonah, N. J., assignors to Burroughs Corporation, Detroit, Mich., a corporation of Michigan Application May 15, 1953, Serial No. 355,294
5 Claims. (Cl. 346—74)

This invention relates to pulse generating systems and more specifically it relates to means for neutralizing ringing in undamped inductive circuits such as transducers adapted for the recording of digital information.

When discrete impulses are used to excite inductive circuits, there is a tendency for the circuit to ring because of inherent distributed capacity which forms a resonant oscillatory circuit. This effect is more pronounced when the inductive circuit has low losses or high inductance such as are desirable for obtaining maximum pulse amplitude and efficiency. Although the ringing can be minimized with resistance or diode damping techniques, these are not entirely suitable. For example, the use of resistance damping will introduce losses which both lower the circuit efficiency and reduce the amplitude gain otherwise possible. Resistive damping also increases circuit time constants, hense lengthening build-up and recovery time. The waveform is also distorted in resistively damped circuits, and the possibility of obtaining sharply defined pulses is limited. The use of diodes in circuits having uni-directional waveforms to some extent improves operation since the resistance is decreased in one direction. If bi-directional waveforms are used diodes are not satisfactory. In general, it is difficult to find perfect diodes with the proper inverse voltage, temperature or current response characteristics to properly damp out ringing. It is also necessary in each of these cases to employ a separate damping circuit arrangement for each of a plurality of inductive circuits, even though the inductive circuits might be similar or identical.

It is, therefore, a general object of the present invention to improve pulse definition in undamped inductive circuits without introducing the inherent inefficiency of prior art devices.

Another object of the invention is to provide improved means and methods for exciting inductive circuits with discrete impulses without inducing ringing.

A further object of the invention is to improve circuit efficiency by providing high gain low loss undamped inductive circuits for high definition response to discrete input pulses.

A still further object of the invention is to provide means and methods for neutralizing the effect of ringing in a plurality of inductive circuits with a single external neutralizing circuit.

Another object of the invention is to provide improved magnetic recording devices capable of producing discrete pulses of high resolution.

In accordance with the present invention a set of selectively actuated exciting pulses are generated for driving inductive circuits. Further neutralization pulses are generated in response to, or in synchronism with, each exciting pulse having such energy and phase with respect to the exciting pulses that the unwanted ringing in an undamped inductive circuit is neutralized thereby. The exciting pulse and paired neutralization pulse are both derived from energy sources outside the driven inductive circuit in response to a single trigger pulse so that the initial response of the inductive circuit to the exciting pulse is not altered and energy neutralization does not begin until the neutralizing pulse arrives. The energy and phase of the neutralizing pulse may be selected so that complete neutralization of the ringing energy is obtained without effect upon the waveshape or energy of the desirable initial pulse response of the circuit to the signal pulse.

Further features and objects of the invention will be found throughout the following more detailed description of the invention, which may be considered in connection with the accompanying drawings wherein.

Figure 1:
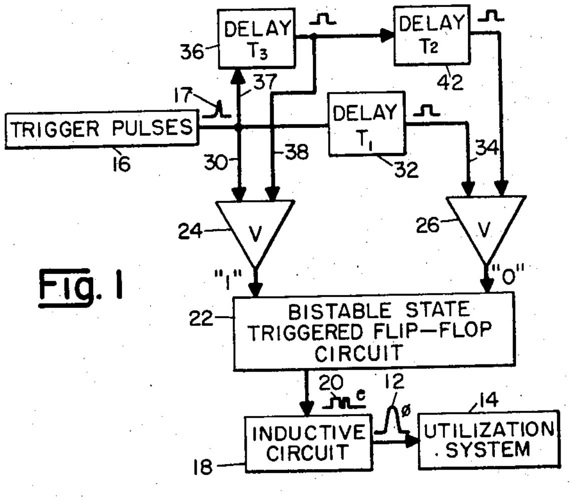
Fig. 1 is a block circuit diagram of a system constructed in accordance with the invention.
Figure 2:
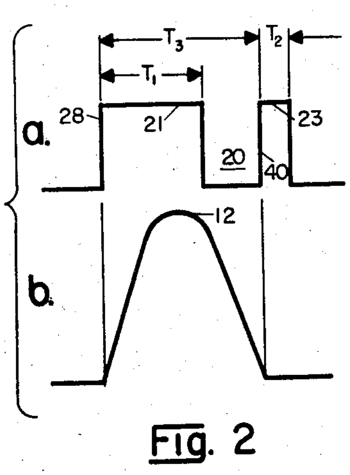
Figs. 2 and 3 are waveform charts illustrating operation of the invention.

Referring now in particular to Figs. 1 and 2 of the drawing, there is shown a system for producing discrete high definition flux pulses 12 for the utilization system 14 which might be a transformer or a magnetic recording surface. The flux pulses are obtained in synchronized response to signals from a suitable input or trigger pulse circuit 16. It may be assumed that sharp low frequency input trigger pulses 17 are obtained from the input circuit 16, although it is to be recognized throughout the description that the particular waveshapes described are only for illustrating the principles of the invention and that other waveforms and means may be utilized without departing from the spirit or the scope of the invention. The system between the input and output circuits serves to provide to inductive circuit 18 a potential waveform 20 of Fig. 2*a* comprising two successive pulses 21 and 23 to induce therein the single high definition flux output pulse 12 of Fig. 2*b*. The desired waveform 20 is, in this embodiment, generally obtained by the use of delay circuits for causing a single input trigger pulse 17 to actuate a bistable state triggered flip flop circuit 22 at the proper times to produce the paired output pulse waveform 20.

More specifically, a pair of pulse mixing circuits ($v$) 24 and 26 are utilized for respectively causing the flip flop circuit 22 to switch to the states "1" and "0" responsive to pulse actuation therethrough. The state "1" is designated to indicate the high potential output state of the flip flop circuit 22 used in deriving the paired pulses of the illustrated embodiments. Conversely the state "0" indicates the low potential output state. Each of the mixing circuits is provided with a pair of input leads for reiving signals corresponding respectively to the two leading edges and the two trailing edges of the paired output pulses. Thus, the initial leading edge 28 of the output pulse is initiated directly with the trigger pulse 17 by medium of lead 30 and mixing circuit 24 which causes the flip flop circuit output potential to rise. The output potential retains its high value for the time $T_1$, as provided in delay circuit 32, after which the delayed trigger pulse by way of lead 34 and the second mixing circuit 26 returns the flip flop circuit to its low potential state. This action provides the exciting pulse 21.

The trigger pulse 17 additionally passes along lead 37 through delay circuit 36 to retrigger the flip flop circuit after time $T_3$ by way of lead 38 to establish the leading edge 40 of the neutralizing pulse 23. After a further delay $T_2$ in circuit 42, the trigger pulse returns the flip flop circuit 22 to its low state where it remains until a later input trigger pulse is received. The trigger pulse generator provides pulses at a low frequency so that the entire waveform 20 is obtained in this manner for every input trigger pulse. Thus, a single well defined output flux pulse 12 is excited by each trigger pulse 17 even though the inductive circuit 18 is excited by both the pulses 21 and 23 of waveform 20.

Figure 3:
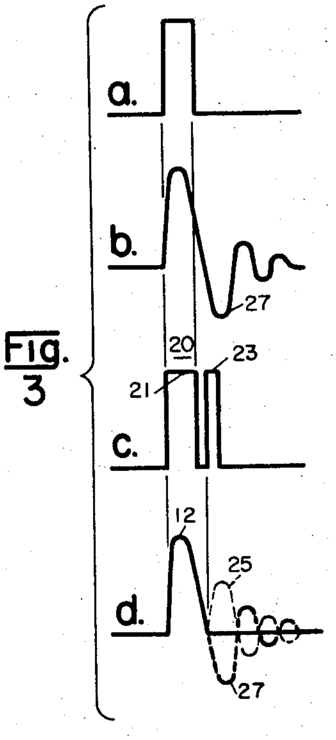

With the present invention therefore in an undamped inductive circuit wherein a single impulse as shown in Fig. 3*a* would afford a low definition output pulse (Fig. 3*b*) having an objectionable ringing transient such as indicated at 27 and therefore providing a poor signal to noise ratio, the provision of the paired input pulses 20 as shown in Fig. 3*c* will provide a single high definition output pulse 12 of Fig. 3*d*. The input exciting pulse 21 of waveform 20 will produce in the inductor a corresponding initial output pulse response 12, whereas the neutralization pulse 23 is so phased and is chosen with the proper amount of energy that it will tend to cause an excitation similar to that of the dotted waveform 25 which is equal and opposite to the dotted ringing transient 27 which would otherwise be produced by the circuit. This generally has been found to occur when a narrow neutralization pulse is spaced in time from the exciting pulse by a half ringing period at the inherent ringing frequency of the inductive circuit. Accordingly, the ringing may be neutralized without alteration of the desired output pulse waveform, since no energy neutralization occurs up to the time at which the leading edge of the neutralization pulse occurs, and thereafter all ringing may be completely neutralized with the effect of greatly increasing the signal to noise pulse response ratio of the circuit. The solid line waveform of Fig. 3*d* therefore corresponds to the flux excited in an undamped inductive circuit by means of the present invention.

Figure 4:
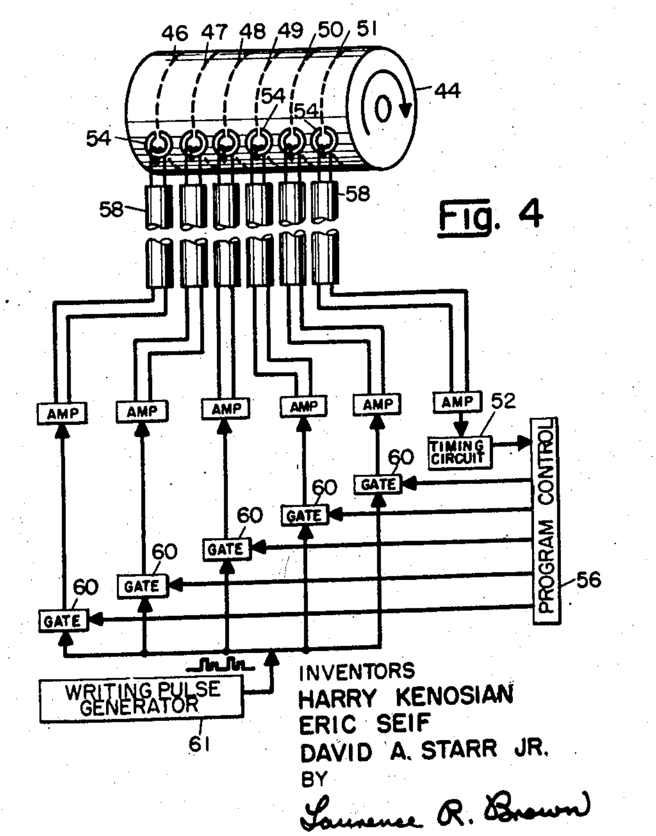
Fig. 4 is a diagrammatic view of a multi-channel magnetic drum recording system embodying the invention.

A typical magnetic recording system wherein discrete high resolution pulses of magnetic flux are desired is shown in Fig. 4. This system comprises a magnetic drum 44 having a plurality of record tracks 46—50 upon which discrete digital information is recorded and preferably indexed by some associated means such as the timing circuit 52 connected with the record track 51. A magnetic transducer or recording head 54 is associated with each track and is adapted for selective excitation by means of a suitable program control circuit 56. In such a system it is highly desirable to pack magnetic pulses corresponding to binary digits closely together about the drum surface. It is obvious that ringing such as shown in Fig. 3*b* would greatly decrease both the available pulse resolution and the signal to noise response. If ordinary damping methods are used, however, the amount of energy necessary for writing with the recording heads 54 would be greatly increased since a large portion of the writing energy would be dissipated in the associated circuit losses and the flux build-up time will be increased.

Highly efficient transducer heads may be designed having low-loss high-Q core materials with many turns, but in such circuits, the ringing amplitude is very high. Ringing is generally also high when long input cables 58 are used with the inductive transducer heads since they include distributed capacity forming with the inductance of the transducer a resonant circuit. Accordingly, the method of neutralizing ringing in accordance with the teachings of this invention is highly desirable for improving the operation of a magnetic recording system.

The desired recording heads are selectively actuated with control signals from the program control circuit 56 which serves to prime one or more of the respective gate circuits 60 for passing a writing pulse of the type hereinbefore described which is established in the writing pulse generator circuit 61. Each undamped recording head in the combination therefore produces a discrete high resolution flux pulse which is recorded in a corresponding indexed cell position upon the magnetic drum 44. In this manner not only is the writing circuit efficiency greatly improved, but the pulse definition and therefore the pulse packing density upon the drum is also improved.

Figure 5:
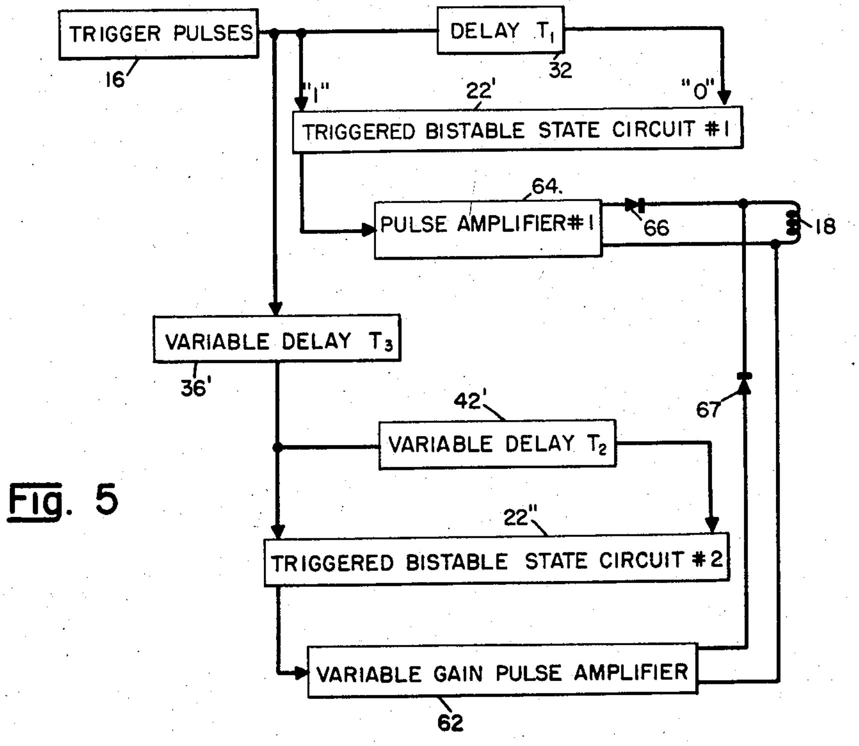
Fig. 5 is a block circuit diagram of a further embodiment of the invention.
Figure 6:
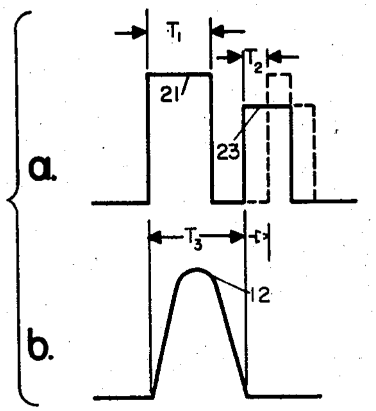
Fig. 6 is a waveform diagram illustrating operation of the circuit of Fig. 5.

It is noted that the paired pulses of waveform 20 may be obtained in many different types of circuits. The circuit described in connection with Figs. 5 and 6 is illustrated as one means for obtaining a versatile selection of the paired pulses most desirable for exciting inductive circuits in the manner described. With this circuit it is possible to quickly ascertain the desired pulse parameters for the most effective neutralization. As shown by the dotted extensions in Fig. 6*a* the neutralization pulse 23 may be generated by this circuit to have varying energy contents and phase displacements by varying the delay period $T_2$ of the leading edge of the neutralizing pulse as well as its duration and amplitude. In general, this is accomplished by a trigger pulse delay circuit similar to the type described in connection with Fig. 1 wherein a separate bistable state circuit 22 is utilized for each of the output pulses 21 and 23. Thus, by providing the variable gain pulse amplifier circuit 62 for the neutralization pulse, its amplitude may readily be varied without affecting the amplitude of the exciting pulse 21. Likewise the variable delay generator 36′ provides means for varying the time $T_2$ to effect proper phasing of the neutralization pulse 23 with respect to the exciting pulse 21 so that the leading edge may start at the desired instant. The variable time delay circuit 42′ ($T_2$) permits the duration of the neutralization pulse to be changed thereby permitting a variable energy content with any given amplitude.

The two separately available output pulses 21 and 23 from pulse amplifiers 62 and 64 are mixed by means of diodes 66 and 67 to provide the proper energy impulses in the inductor 18, or other utilization circuit, for the desired flux output pulse 12 of Fig. 6*b*. It is readily recognizable that in accordance with the present invention the neutralizing pulse has such energy and is so phased with respect to the exciting pulse that high definition flux pulses may be obtained from inductive circuits without ringing transients. Should it be desirable for any purpose to retain desirable portions of the ringing, this may be accomplished by choosing the desired phase and polarity of the neutralization pulse response to become effective when desired.

The invention, therefore, provides methods and means of increasing pulse definition and signal to noise ratios in pulse responsive inductive circuits, whereby both circuit efficiency and circuit resolution is favorably increased. In accordance with one phase of the present invention, a plurality of similar undamped inductive circuits may be excited from a single pulse source to provide transient free response. Those features of novelty believed descriptive of the nature of the invention are, therefore, defined with particularity in the appended claims.

What is claimed is:

1. In a magnetic recording system; a recording head of magnetic material having a coil positioned for passing flux through said magnetic material; a magnetic record medium positioned to receive magnetic flux from said recording head; first means for producing a first pulse of current and connected for passing said first pulse in a selected direction through said coil to record on said record medium a flux pulse and tending to record additionally a periodic transient component immediately following said flux pulse; and second means responsive to said first means for producing a second pulse of current of selected magnitude and for passing said second pulse of current through said coil in the same direction as said first current pulse but time-spaced therefrom by one-half wave at the periodicity of said transient component to tend to record on said record medium a flux corresponding to said periodic transient component but of opposite phase therefrom, said selected magnitude of said second pulse of current being such that the flux resulting from said second pulse cancels substantially said periodic transient component, thereby to effect recording in said medium of a flux pulse free of periodic transient component.

2. In a magnetic recording system; a ring of magnetic material having an air gap therein; a magnetic record medium positioned adjacent said air gap; an undamped coil positioned for generating flux in said magnetic material, air gap and record medium; first means for producing a first pulse of current and for passing said first pulse in a selected direction through said coil to generate a first undamped flux wave comprising an initial flux pulse followed immediately by a ringing transient of predetermined periodicity; and second means responsive to said first means for producing a second pulse of current of selected magnitude and for passing said second pulse of current through said coil in the same direction as said first current pulse but time-spaced therefrom by one-half wave at the periodicity of said transient to generate a second undamped flux wave 180 degrees out of phase with respect to said first, said selected magnitude of said second current pulse being such that the flux resulting from said second pulse cancels substantially said ringing transient of the flux wave generated by said first pulse, thereby to effect recording of a flux pulse in said magnetic record medium free of a ringing transient component.

3. In a magnetic recording system; a ring of magnetic material; a magnetic record medium positioned adjacent said ring; an undamped coil positioned for generating flux in said magnetic material and record medium; means for passing a first pulse of current in a selected direction through said coil to generate a first undamped flux wave comprising a flux pulse followed by a ringing transient of predetermined periodicity; and means for producing a second pulse of current of selected amplitude and for passing said second pulse of current through said coil in the same direction as said first current pulse but time-spaced therefrom by one-half wave at the periodicity of said transient to generate a second undamped flux wave of opposite phase from said first, said selected magnitude of said second pulse being such that the flux resulting from said second pulse substantially cancels said ringing transient of the flux wave generated by said first current pulse to effect recording of a flux pulse in said magnetic record medium.

4. In a magnetic recording system; a ring of magnetic material having an air gap therein; a coil positioned for generating flux in said magnetic material and in said air gap, said coil having inductance and inherent capacity and a tendency to ring at a resonant frequency; a magnetic record medium adjacent said air gap; first means for passing a first pulse of current in a selected direction through said coil whereby as a result of said ringing tendency an undamped pattern of flux tends to be established in said magnetic material, air gap and record medium; and means for producing a second pulse of current of selected energy content and for passing said second pulse of current through said coil in said same direction but lagging said first current pulse by substantially one-half period at the ringing frequency of said coil to establish a second undamped pattern of flux, said selected energy content of second current pulse being such that following the initial one-half period the flux pattern established by said second current pulse substantially cancels the flux pattern established by said first current pulse.

5. A high-definition pulse-recording system comprising, in combination; a magnetic record surface having a plurality of record tracks; a separate recording head for each track which in response to applied pulse signals tends to produce a flux pulse followed by a ringing transient; a plurality of gating circuits coupled to corresponding of said recording heads; a writing pulse generator connected to said gating circuits; a circuit for selectively conditioning said gating circuits to pass pulses from said generator to a corresponding recording head to produce a flux pulse in a corresponding track, said writing pulse generator including means for generating for each pulse to be recorded a pair of pulses of the same polarity the second of which lags the first by approximately 180 degrees at the periodicity of the said ringing transient and of such relative magnitudes that the flux produced by said second pulse of said pair tends to neutralize said ringing transient of the flux pulse produced by said first pulse of said pair, whereby a single high-definition flux pulse may be recorded in said record surface.

References Cited in the file of this patent

UNITED STATES PATENTS

| | | |
|---|---|---|
| 2,273,193 | Heising | Feb. 17, 1942 |
| 2,405,552 | Blumlein | Aug. 13, 1946 |
| 2,408,061 | Grieg | Sept. 24, 1946 |
| 2,436,829 | Roth | Mar. 2, 1948 |
| 2,540,654 | Cohen | Feb. 6, 1951 |